(12) United States Patent
Kumar et al.

(10) Patent No.: US 12,265,999 B2
(45) Date of Patent: Apr. 1, 2025

(54) SYSTEMS AND METHODS FOR AUTOMATIC MANAGEMENT OF MULTIPLE ACCOUNTS

(71) Applicant: Capital One Services, LLC, McLean, VA (US)

(72) Inventors: Kaush Kumar, McLean, VA (US); Jeffrey Rule, Chevy Chase, MD (US); Jinlian Wang, Falls Church, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 208 days.

(21) Appl. No.: 17/994,963

(22) Filed: Nov. 28, 2022

(65) Prior Publication Data

US 2024/0177208 A1    May 30, 2024

(51) Int. Cl.
*G06Q 30/00*      (2023.01)
*G06Q 20/32*      (2012.01)
*G06Q 30/0601*    (2023.01)

(52) U.S. Cl.
CPC ..... *G06Q 30/0609* (2013.01); *G06Q 20/3278* (2013.01)

(58) Field of Classification Search
CPC ................................................. G06Q 30/06–08
See application file for complete search history.

(56) References Cited

U.S. PATENT DOCUMENTS

| | | | |
|---|---|---|---|
| 8,620,788 B2 | 12/2013 | Biske | |
| 9,628,484 B2 | 4/2017 | Perrone, II et al. | |
| 10,771,471 B2 | 9/2020 | Enqvist et al. | |
| 11,055,421 B2 | 7/2021 | Garcia et al. | |
| 11,108,752 B2 | 8/2021 | Maxwell | |
| 11,196,730 B2 | 12/2021 | Eisen et al. | |
| 11,405,380 B2* | 8/2022 | Dorfman | G06Q 20/3276 |
| 2009/0043699 A1 | 2/2009 | Elterich | |
| 2014/0229331 A1* | 8/2014 | McIntosh | G06Q 30/0613 |
| | | | 705/26.41 |

OTHER PUBLICATIONS

"EnfoTrust networks Partners with Govolution, Inc. to Revolutionize E-Government Services", PR Newswire, Sep. 12, 2000 (Year: 2000).*

\* cited by examiner

*Primary Examiner* — Ethan D Civan
(74) *Attorney, Agent, or Firm* — HUNTON ANDREWS KURTH LLP

(57) ABSTRACT

Systems and methods for automatic management of multiple accounts are provided. Example embodiments of the present disclosure provide a server configured to authenticate a user, detect the user is visiting an online website associated with a merchant, create a user account with the merchant for the user, where the user account including a user name and a password. The server can be further configured to retrieve personal identifiable information (PII) of the user from a financial account associated with the user, where the PII including information of a payment card of the user, provision the PII of the user to the merchant; and store the password.

20 Claims, 7 Drawing Sheets

SYSTEMS AND METHODS FOR AUTOMATIC MANAGEMENT OF MULTIPLE ACCOUNTS

FIELD OF THE INVENTION

The present disclosure relates generally to account management, and more particularly, to systems and methods for automatic management of multiple accounts.

BACKGROUND

Online shopping is increasing in popularity due to convenience and a wide range of product and service offerings. Users typically have to manage multiple online accounts associated with multiple merchants and separately provide their payment card information at checkout after creating an online account at the merchant website. This may create inconvenience and discourage users from carrying out transactions, which is detrimental to merchants.

Further, when there is a need for the users to update their online account information (e.g., phone numbers, payment card numbers) due to, for example, lost cards or real or potential fraudulent activity, users have to update their online accounts separately with the multiple merchants, which may cause further inconvenience.

These and other deficiencies exist. Accordingly, there is a need to provide systems and methods that overcome these deficiencies to reduce task and inconvenience for both the users and merchants.

SUMMARY

Aspects of the disclosed technology include systems and methods for automatic management of multiple accounts.

Embodiments of the present disclosure provide a system. The system can comprise a server. The server is configured to: train one or more machine learning models using user account data fields associated with one or more merchant websites; authenticate a user; detect the user is visiting an online website associated with a merchant; identify a user name field and a password field of the online website using the one or more machine learning models; create a user account with the merchant for the user on the online website, the user account including a user name corresponding to the user name field and a password corresponding to the password field; retrieve personal identifiable information (PII) of the user from a financial account associated with the user, the PII including information of a payment card of the user; provision the PII of the user to the merchant; and store the password.

Embodiments of the present disclosure provide a method. The method can comprise: training, by a server, one or more machine learning models using user account data fields associated with one or more merchant websites; authenticating, by the server, a user; detecting, by the server, the user is visiting an online website associated with a merchant; identifying, by the computer, a user name field and a password field of the online website using the one or more machine learning models; creating, by the server, a user account with the merchant for the user on the online website, the user account including a user name corresponding to the user name field and a password corresponding to the password field; retrieving, by the server, personal identifiable information (PII) of the user from a financial account associated with the user, the PII including information of a payment card of the user; provisioning, by the server, the PII of the user to the merchant; and storing, by the server, the password.

Embodiments of the present disclosure provide a non-transitory, computer readable medium. The non-transitory, computer readable medium can comprise instructions that, when executed on a server, perform actions comprising: training one or more machine learning models using user account data fields associated with one or more merchant websites; authenticating a user; detecting that the user is visiting an online website associated with a merchant; identifying a user name field and a password field of the online website using the one or more machine learning models; creating a user account with the merchant for the user on the online website, the user account including a user name corresponding to the user name field and a password corresponding to the password field; retrieving personal identifiable information (PII) of the user from a financial account associated with the user, the PII including information of a payment card of the user; provisioning the PII of the user to the merchant; and storing the password.

Further features of the disclosed systems and methods, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
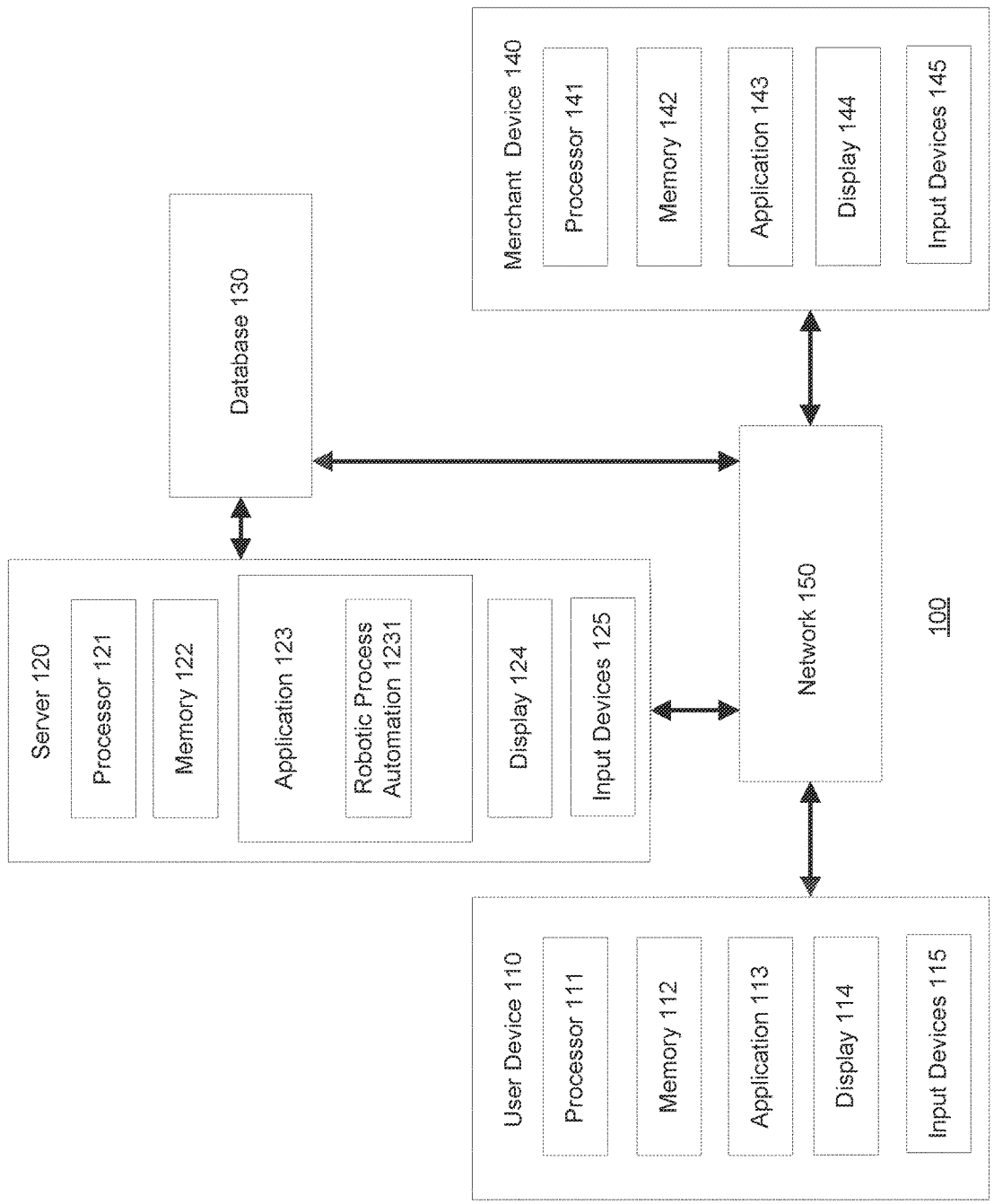
FIG. 1 is a diagram of a system for automatic management of multiple account according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems and methods for automatic management of multiple online accounts for users. In this disclosure, for example, a user of a financial institution (e.g., a bank) has a financial account (e.g., a savings account, a checking account, or a credit card account) administered by the financial institution, and one or more payment cards associated with the financial account. The disclosed systems and methods can facilitate the user to manage multiple online accounts associated with multiple merchants and associated with the financial account (e.g., the one or more payment cards will be or have been provisioned to the multiple online accounts). Advantageously, the financial institution can be a hub for managing the user's relationships with the multiple merchants.

For example, the disclosed systems and methods enable new account creation at merchants from the banking application automatically for or on behalf of the user. For new account creation, the user may log into the bank application installed on a mobile device of the user or may read and/or tap a security card associated with the financial account using the mobile device. The systems and methods disclosed herein can then retrieve personal identifiable information (PII) of the user and/or payment card information associated with the financial account from a database or datastore of the financial institution. The PII may include, but is not limited to, name of the user, phone number of the user, email of the user, home address of the user, social security number of the user, account information of the user, annual income of the user, and/or loan information of the user. The payment card information may include, but is limited to, a card number, a virtual card number (VCN), expiration date, security number, and the like. The user may then visit a website of a merchant for shopping inside the bank application. The systems and methods disclosed herein detect the user's behavior, and then apply Robotic Process Automation (RPA) at the merchant's website, e.g., execute a script mimicking a user clicking at various places on the merchant website to perform needed actions. The RPA can automatically create a user account with the merchant on behalf of the user, which includes a login user name and/or password. The login user name can be an email of the user on file with the financial institution, and the password can be autogenerated. The systems and methods disclosed herein can then put the PII and/or VCN on file with the merchant, which is all the necessary information to create a user account and put a payment card on file with the merchant. The password may be saved to an integrated password management application, in the bank application, and/or the iOS keychain. All the information required above is from bank verified identity, therefore is real and secure. The systems and methods disclosed herein enable the financial institution to be a hub of the user for the time the user starts the relationship with the merchant and enable the new account creation at the merchant from the banking app.

The systems and methods disclosed herein can further update the merchant with new payment card numbers automatically on behalf of the user if the payment card number on file with the merchant is reported due to lost card or fraud on card. Therefore, the systems and methods disclosed herein enable the bank as a relationship manager with the merchants with which the user has online accounts, which can reduce the friction involved in creating an online account for both the user and the merchant. In this disclosure, the online accounts are still owned by the user because the systems and methods disclosed herein use the user's email on file with the bank and a password the user can find in the banking application. The password can also be changed by the user as he/she desires.

Example embodiments disclosed herein may offer advantages compared with other systems and/or methods, such as logging via a third party site (e.g., Google, Facebook, and/or Apple), which do not verify the identity of a user at the level banks are required to do. In contrast, the example embodiments disclosed herein uses the user's addresses (e.g., home or mailing address) and payment card on file that can be provided to the merchant to reduce steps/friction in the online checkout moment. Even though the other systems/methods have a user's payment card and addresses on file, the payment card will not automatically get updated if there is fraud on account and a new card number will not be generated automatically. Example embodiments can link with the merchants and provide new card numbers to merchants on an as-needed basis. For example, example embodiments will not provide a new card number to a merchant where massive fraudulent activities has been discovered or where the user has actually reported fraud, so these embodiments will be selective and directed to where it is most beneficial to the user.

FIG. 1 illustrates a system 100 for automatic management of multiple accounts according to an example embodiment. As further discussed below, the system 100 may include a user device 110, a server 120, a database 130, and a merchant device 140 in communication using a network 150. Although FIG. 1 illustrates single instances of the components, the system 100 may include any number of components.

The user device 110 can be configured to present to a user a user interface from which the user may log into, for example, their bank or credit card account to access their transaction statement and/or financial information stored in the database 130 of the server 120. The user device 110 may be configured to display on the user interface a merchant's website, in response to a selection by the user of accessing the merchant's website. The server 120 may be associated with an institution, such as a financial institution, and can be configured to access the merchant's website hosted by the merchant device 140. The merchant device 140 may be associated with a merchant with which the transactions are conducted by the user through the user device 110, for example, online purchases made from the merchant. The merchant device 140 can be configured to store the online merchant accounts, and to present a shopping interface on which the user can conduct the transactions with the merchant.

The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smart card (e.g., a contact-based card or a contactless card), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, an application 113, a display 114, and input devices 115. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as application 113, and other data, such as private and personal information.

The application 113 may comprise one or more software applications comprising instructions for execution on the user device 110. In some examples, the user device 110 may execute one or more applications, such as software applications, that enable, for example, network communications with one or more components of the system 100, transmit and/or receive data, and perform the functions described herein such as presenting the online website to the user of the user device 110. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein such as selecting an option of creating an online account with the merchant.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smart card (e.g., a contact-based card or a contactless card), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, an application 123, a display 124, and input devices 125. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's shopping and financial account information.

The application 123 may comprise one or more software applications, such as robotic process automation (RPA) module 1231, comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the robotic process automation (RPA) module 1231 of the application 123 may be executed to perform creating a new online account for the user with the merchant associated with the merchant device 140. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 130 may be one or more databases configured to store date, including without limitation, private information of users, financial accounts of users, online merchant account information, transactions of users, and merchant records indicative of corresponding merchants. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120.

The merchant device 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smart card (e.g., a contact-based card or a contactless card), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The merchant device 140 may include a processor 141, a memory 142, and an application 143. The processor 141 may be a processor, a microprocessor, or other processor, and the merchant device 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the merchant device 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 142 may be configured to store one or more software applications, such as the application 143, and other data, such as user's shopping and financial account information.

The application 143 may comprise one or more software applications comprising instructions for execution on the merchant device 140. In some examples, the merchant device 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. For example, the application 143 may be executed to perform storing the online merchant accounts. The application 143 may also be executed to perform processing transactions of a user who may shop online from the merchant. Such processes may be implemented in software, such as software modules, for execution by computers or other machines. The application 143 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The merchant device 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the merchant device 140 that is available and supported by the merchant device 140, such as a touch-screen, keyboard, mouse, cursor-control device, touch-screen, microphone, digital camera, video recorder or camcorder. These devices may be used to enter information and interact with the software and other devices described herein.

The system 100 may include one or more networks 150. In some examples, the network 150 may be one or more of a wireless network, a wired network or any combination of wireless network and wired network, and may be configured to connect the user device 110, the server 120, the database 130, and the merchant device 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the user device 110, server 120, and merchant device 140 using the network 150 can occur using one or more front channels and one or more secure back channels. A front channel may be a communication protocol that employs a publicly accessible and/or unsecured communication channel such that a communication sent to the user device 110, server 120, and/or merchant device 140 may originate from any other device, whether known or unknown to the user device 110, server 120, and/or merchant device 140, if that device possesses the address (e.g., network address, Internet Protocol (IP) address) of the user device 110, server 120, and/or merchant device 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 110, server 120, and/or merchant device 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some examples, the user device 110 can be associated with a user and may be operated by that user, such as a user of a bank. The server 120 can be associated with a financial institution, such as a bank or a credit card company that offers financial services to the user of the user device 110. The merchant device 140 can be associated with a merchant with which the user of the user device 110 may conduct transactions, and may be operated by that merchant, such as an online retailer.

Figure 2:
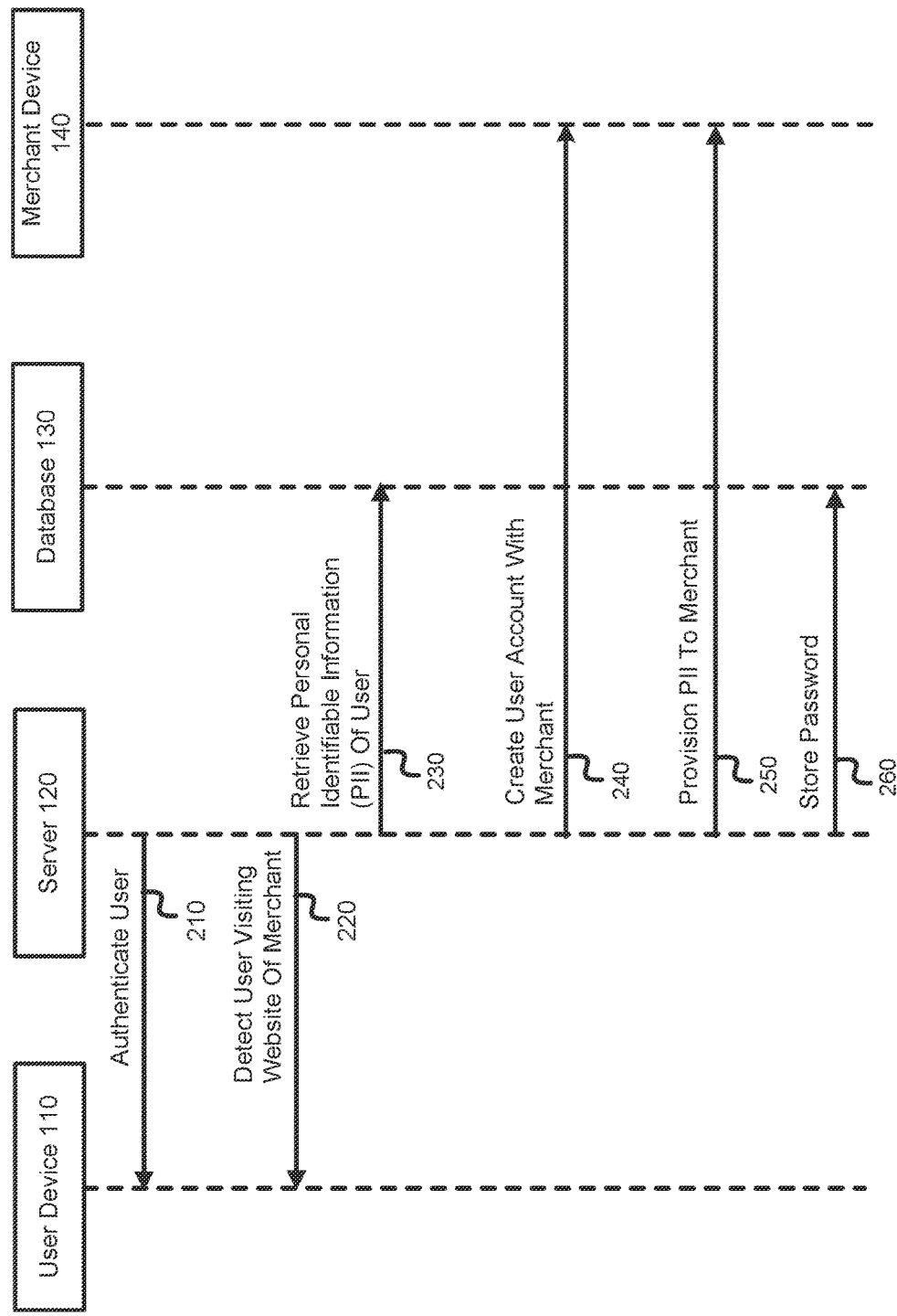
FIG. 2 is a diagram of sequential interactions between components of the system in FIG. 1 according to an example embodiment.

FIG. 2 illustrates an example diagram 200 of sequence interaction between the components of the system 100 according to an example embodiment. FIG. 2 may reference the same or similar components as those illustrated in FIG. 1, including a user device, a server, a database, and a merchant device.

When a user wants to make an online purchase from a merchant, the user may use the user device 110 to log into (such as by entering user name and password) his/her bank account from a bank application (such as the application 113) installed on the user device 110. Upon logging into the bank account, the server 120 can authenticate the user at step 210 based on the login credential (e.g., the user name and password). In some embodiments, the server 120 may also require the user to enter a personal identification code as a second authentication factor. Alternatively, the server 120 may require the user to enter a one-time passcode (OTP) as a second authentication factor that is randomly generated and transmitted by the server 120 to the user device 110 in a text message.

Once logging into the bank account, the user may visit a website associated with the merchant and hosted by the merchant device 140. At step 220, the server 120 may detect the user is visiting the website of the merchant, such as by receiving the Uniform Resource Locator (URL) link (i.e., a web address) of the website of the merchant the user is entering.

At step 230, the server 120 may retrieve personal identifiable information (PII) of the user associated with the financial account of the user and stored in the database 130. The PII may include, but is not limited to, a home/mailing address, a billing address, a mobile phone number, a home phone number, an Email address, a 16-digit credit card number, a 16-digit virtual card number (VCN), and/or a credit card expiration date.

At step 240, the server 120 may automatically create an online account with the merchant on behalf of the user. For example, the server 120 may go to the website of the merchant using Robotic Process Automation (RPA). The RPA can automatically create the online account with the merchant on behalf of the user, which includes a login user name and/or password. The login user name can be the email address of the user included in the PII of the user, and the password can be autogenerated by the RPA. In some embodiment, the merchant device 140 may send to the email address of the user an account activation link. The RPA can automatically click on the account activation link to activate the created online account.

At step 250, the server 120 can automatically provision the PII to the online account that may be hosted on the merchant device 140 of the merchant. For example, the RPA may put the home/mailing address, the billing address, the mobile phone number, the Email address, the 16-digit credit card number, the 16-digit virtual card number (VCN), and/or the credit card expiration date on file with the merchant, which is all the necessary information to create the online account with the merchant.

At step 260, the server 120 may store the password of the online account. For example, the server 120 may save the password to an integrated password management application, in the bank application, and/or in the iOS® keychain. The user and the server 120 can access the password. The user may change the password as he/she wishes.

As described above, the present disclosure can enable a user's bank as a primary hub to set up accounts at merchants automatically on behalf of the user. Therefore, when the user goes to an online merchant for shopping and would like to set up an account with the merchant, put in all of the basic information, add his/her credit card, and then start shopping, the systems and methods disclosed herein can enable the user's bank as the central location to facilitate the user with getting his/her credit card and then ultimately making a payment on their behalf.

In some embodiments, the bank application can be web based application or a mobile application. For example, when the user wants to shop, the user can go to the merchant website from within the bank application. Then when the user gets on that website, the systems and methods disclosed herein can create an account for the user instead of the user creating an account. The bank application already has the user's email address, the user's mailing address where the user will get the product, the user's credit card number, the user's full name, and the like. The systems and methods disclosed herein can then create a password for the user and a wallet within the bank application where this password will be saved. Accordingly, the user can always log into this wallet to get this password and change it if the user so desires.

In some embodiments, the server 120 may train one or more machine learning models using user account data fields associated with one or more merchant websites. The server 120 may identify a user name field and a password field of the online website using the one or more machine learning models, and create the user account with the merchant for the user on the online website. The user account may include a user name corresponding to the user name field and a password corresponding to the password field.

Figure 3:
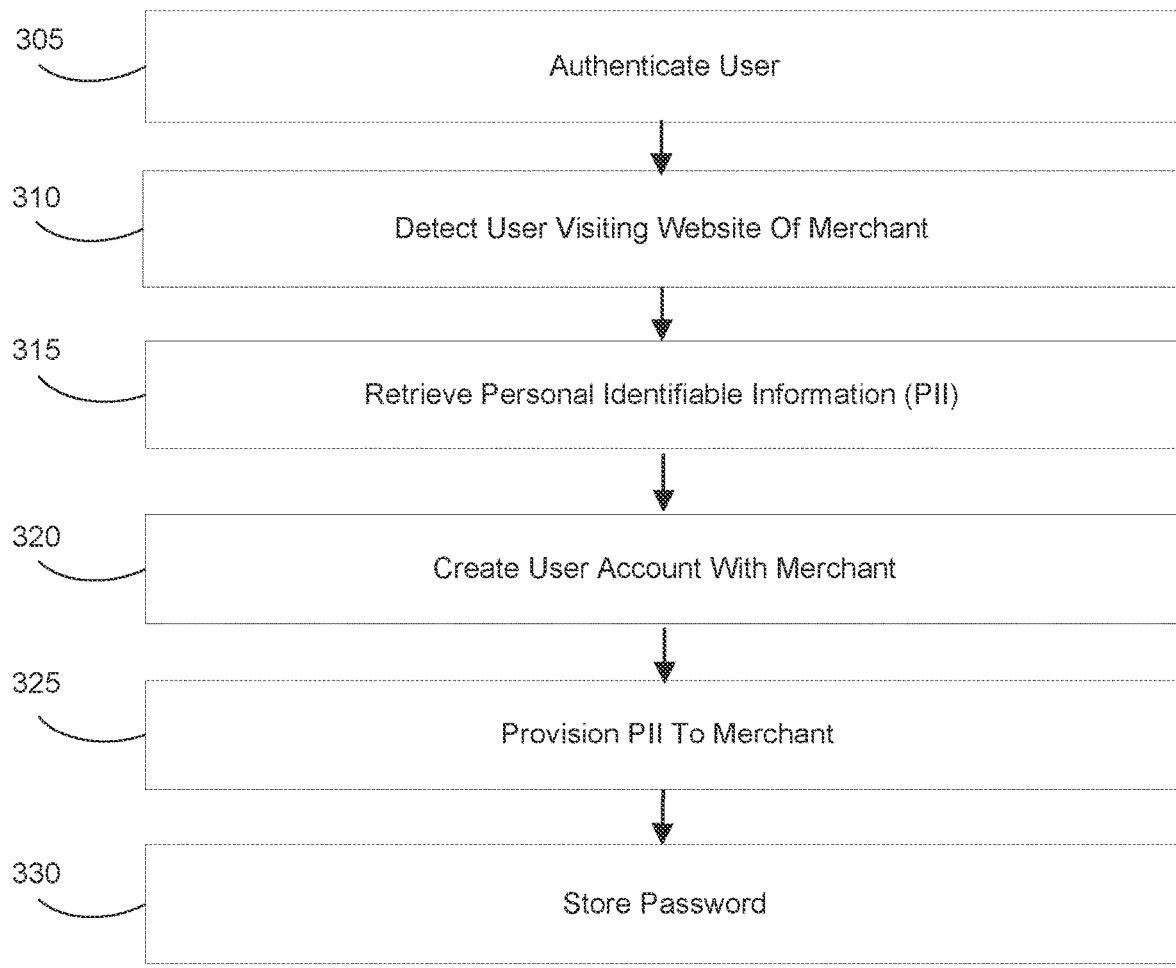
FIG. 3 is a flow chart of a method for automatic management of multiple account according to an example embodiment.

FIG. 3 illustrates a flow chart of an example method 300 for automatic multiple account management according to an example embodiment. FIG. 3 may reference the same or similar components as those illustrated in FIGS. 1 and 2, including a user device, a server, a database, and a merchant device. The method 300 can be implemented in the system 100 and may include, but is not limited to the following steps.

In step 305, the server 120 authenticates a user who is using the user device 110. The user may use the user device 110 to log into (such as by entering user name and password) his/her bank account from a bank application (such as the application 113) installed on the user device 110. Upon logging into the bank account, the server 120 can authenticate the user based on the login credential (e.g., the user name and password). In some embodiments, the server 120 may also require the user to enter a personal identification code as a second authentication factor. Alternatively, the server 120 may require the user to enter a one-time passcode (OTP) as a second authentication factor that is randomly generated and transmitted by the server 120 to the user device 110 in a text message.

In step 310, the server 120 may detect the user visiting a website associated with a merchant inside the bank application. For example, when the user wants to make an online purchase from the merchant, after logging into the bank application, the user may visit the website associated with the merchant and hosted by the merchant device 140. The server 120 may detect the user is visiting the website of the merchant, such as by receiving the Uniform Resource Locator (URL) link (i.e., a web address) of the website of the merchant the user is entering.

In step 315, the server 120 may retrieve personal identifiable information (PII) of the user associated with the financial/bank account of the user and stored in the database 130. The PII may include, but is not limited to, a home/mailing address, a billing address, a mobile phone number, a home phone number, an Email address, a 16-digit credit card number, a 16-digit virtual card number (VCN), and/or a credit card expiration date.

In step 320, the server 120 automatically creates an online account with the merchant on behalf of the user. For example, the server 120 may go to the website of the merchant using Robotic Process Automation (RPA). The RPA can automatically create the online account with the merchant on behalf of the user, which includes a login user name and/or password. The login user name can be the email address of the user included in the PII of the user, and the password can be autogenerated by the RPA. In some embodiment, the merchant device 140 may send to the email address of the user an account activation link. The RPA can automatically click on the account activation link to activate the created online account.

In step 325, the server 120 can automatically provision the PII to the online account that may be hosted on the merchant device 140 of the merchant. For example, the RPA may put the home/mailing address, the billing address, the mobile phone number, the Email address, the 16-digit credit card number, the 16-digit virtual card number (VCN), and/or the credit card expiration date on file with the merchant, which is all the necessary information to create the online account with the merchant.

In step 330, the server 120 may store the password of the online account. For example, the server 120 may save the password to an integrated password management application, in the bank application, and/or in the iOS® keychain. The user and the server 120 can access the password. The user may change the password as he/she wishes.

In some embodiments, the server 120 may use a machine mimicking a human that goes to the website of the merchant to create the account, by searching for a log-in screen, a user name field, a password field, and so forth. All of those things can be figured out technically through what is called the Document Object Model (DOM), and the machine just does those things on behalf of the user.

In some embodiments, the password can be stored within the banking application. In some embodiments, the user may want to go log into that website or merchant independently, then the server 120 may have an integration into the user's password manager or into the IOS® keychain so that the password is not locked into the banking application. In some embodiments, the password may be shared with other password-handing applications.

In some embodiments, the method 300 may further comprise training, by the server 120, one or more machine learning models using user account data fields associated with one or more merchant websites; identifying, by the server 120, a user name field and a password field of the online website using the one or more machine learning models; and creating, by the server 120, a user account with the merchant for the user on the online website, the user account including a user name corresponding to the user name field and a password corresponding to the password field.

Figure 4:
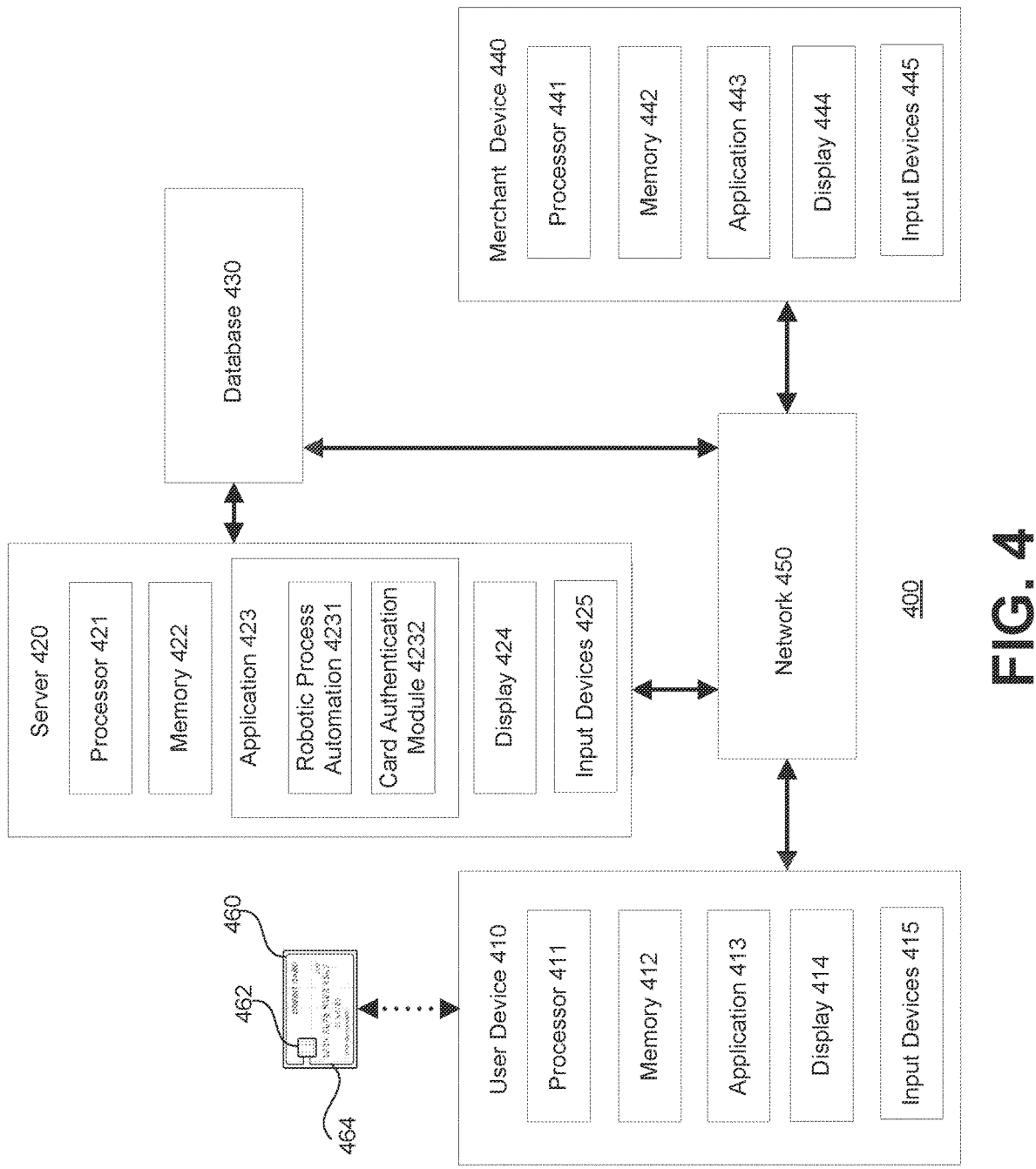
FIG. 4 is a diagram of a system for automatic management of multiple account according to an example embodiment.

In some embodiments, the server may authenticate the user based on a contactless card instead of the login credential of the user for the banking application. For example, when the user taps or reads the contactless card using the user device, the server can receive unique information associated with the contactless card and then authenticate the user based on the unique information. FIG. 4 illustrates a system 400 including a contactless card for automatic management of multiple accounts according to an example embodiment. As further discussed below, the system 400 may include a user device 410, a server 420, a database 430, a merchant device 440 in communication using a network 150, and a contactless card 460 in signal communication with the user device 410. Although FIG. 4 illustrates single instances of the components, the system 400 may include any number of components.

The user device 410 can be configured to present to a user a user interface from which the user may log into, for example, their bank or credit card account to access their transaction statement and/or financial information stored in the database 430 of the server 420. The user interface may also be configured to perform data communication with the contactless card 460. The user device 410 may be configured to display on the user interface a merchant's website, in response to a selection by the user of accessing the merchant's website. The server 120 may be associated with an institution, such as a financial institution, and can be configured to access the merchant's website hosted by the merchant device 440. The merchant device 440 may be associated with a merchant with which the transactions are conducted by the user through the user device 410, for example, online purchases made from the merchant. The merchant device 440 can be configured to store the online merchant accounts, and to present a shopping interface on which the user can conduct the transactions with the merchant. The contactless card 460 may be any type of card, such as a security card, a payment card, an identification card, and the like. The contactless card 460 may be issued to the user by the financial institution for identity verification for the bank account of the user.

The user device 410 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smart card (e.g., a contact-based card or a contactless card), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 410 may include a processor 411, a memory 412, an application 413, a display 414, and input devices 415. The processor 411 may be a processor, a microprocessor, or other processor, and the user device 410 may include one or more of these processors. The processor 411 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 411 may be coupled to the memory 412. The memory 412 may be a read-only memory, write-once read-multiple memory or read/write memory, e.g., RAM, ROM, and EEPROM, and the user device 410 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 412 may be configured to store one or more software applications, such as application 413, and other data, such as private and personal information.

The application 413 may comprise one or more software applications comprising instructions for execution on the user device 410. In some examples, the user device 410 may execute one or more applications, such as software applications, that enable, for example, network communications with one or more components of the system 400, transmit and/or receive data, and perform the functions described herein such as presenting the online website to the user of the user device 410 and reading the contactless card 460. Upon execution by the processor 411, the application 413 may provide the functions described in this specification, specifically to execute and perform the steps and functions in the process flows described below. Such processes may be implemented in software, such as software modules, for execution by computers or other machines. The application 413 may provide graphic user interfaces (GUIs) through which users may view and interact with other components and devices within the system 400. The GUIs may be formatted, for example, as web pages in HyperText Markup Language (HTML), Extensible Markup Language (XML) or in any other suitable form for presentation on a display device depending upon applications used by users to interact with the system 400.

The user device 410 may further include a display 414 and input devices 415. The display 414 may be any type of device for presenting visual information such as a computer monitor, a flat panel display, and a mobile device screen, including liquid crystal displays, light-emitting diode displays, plasma panels, and cathode ray tube displays. The input devices 415 may include any device for entering information into the user device 410 that is available and supported by the user device 410, such as a touch-screen, keyboard, mouse, cursor-control device, touch-screen, microphone, digital camera, video recorder or camcorder. These devices may be used to enter information and interact with the software and other devices described herein such as selecting an option of creating an online account with the merchant.

The server 420 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smart card (e.g., a contact-based card or a contactless card), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 420 may include a processor 421, a memory 422, and an application 423. The processor 421 may be a processor, a microprocessor, or other processor, and the server 120 may include one or more of these processors. The processor 421 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 421 may be coupled to the memory 422. The memory 422 may be a read-only memory, write-once read-multiple memory or read/write memory, e.g., RAM, ROM, and EEPROM, and the server 420 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 422 may be configured to store one or more software applications, such as the application 423, and other data, such as user's shopping and financial account information.

The application 423 may comprise one or more software applications, such as robotic process automation (RPA) module 4231 and card authentication module 4232, comprising instructions for execution on the server 420. In some examples, the server 420 may execute one or more applications, such as software applications, that enable, for example, network communications with one or more components of the system 400, transmit and/or receive data, and perform the functions described herein. Upon execution by the processor 421, the application 423 may provide the functions described in this specification, specifically to execute and perform the steps and functions in the process flows described below. For example, the robotic process automation (RPA) module 4231 of the application 423 may be executed to perform creating a new online account for the user with the merchant associated with the merchant device 440, and the card authentication module 4232 of the application 423 may be executed to perform authenticating the user based on the contactless card 460. Such processes may be implemented in software, such as software modules, for execution by computers or other machines. The application 423 may provide GUIs through which a user may view and interact with other components and devices within the system 400. The GUIs may be formatted, for example, as web pages in HyperText Markup Language (HTML), Extensible Markup Language (XML) or in any other suitable form for presentation on a display device depending upon applications used by users to interact with the system 400.

The server 420 may further include a display 424 and input devices 425. The display 424 may be any type of device for presenting visual information such as a computer monitor, a flat panel display, and a mobile device screen, including liquid crystal displays, light-emitting diode displays, plasma panels, and cathode ray tube displays. The input devices 425 may include any device for entering information into the server 420 that is available and supported by the server 420, such as a touch-screen, keyboard, mouse, cursor-control device, touch-screen, microphone, digital camera, video recorder or camcorder. These devices may be used to enter information and interact with the software and other devices described herein.

The database 430 may be one or more databases configured to store date, including without limitation, private information of users, financial accounts of users, online merchant account information, transactions of users, and merchant records indicative of corresponding merchants. The database 430 may comprise a relational database, a non-relational database, or other database implementations, and any combination thereof, including a plurality of relational databases and non-relational databases. In some examples, the database 430 may comprise a desktop database, a mobile database, or an in-memory database. Further, the database 430 may be hosted internally by the server 420 or may be hosted externally of the server 420, such as by a server, by a cloud-based platform, or in any storage device that is in data communication with the server 420.

The merchant device 440 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smart card (e.g., a contact-based card or a contactless card), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The merchant device 440 may include a processor 441, a memory 442, and an application 443. The processor 441 may be a processor, a microprocessor, or other processor, and the merchant device 440 may include one or more of these processors. The processor 441 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 441 may be coupled to the memory 442. The memory 442 may be a read-only memory, write-once read-multiple memory or read/write memory, e.g., RAM, ROM, and EEPROM, and the merchant device 440 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 442 may be configured to store one or more software applications, such as the application 443, and other data, such as user's shopping and financial account information.

The application 443 may comprise one or more software applications comprising instructions for execution on the merchant device 440. In some examples, the merchant device 440 may execute one or more applications, such as software applications, that enable, for example, network communications with one or more components of the system 400, transmit and/or receive data, and perform the functions described herein. Upon execution by the processor 441, the application 443 may provide the functions described in this specification, specifically to execute and perform the steps and functions in the process flows described below. For example, the application 443 may be executed to perform storing the online merchant accounts. The application 443 may also be executed to perform processing transactions of a user who may shop online from the merchant. Such processes may be implemented in software, such as software modules, for execution by computers or other machines. The application 443 may provide GUIs through which a user may view and interact with other components and devices within the system 400. The GUIs may be formatted, for example, as web pages in HyperText Markup Language (HTML), Extensible Markup Language (XML) or in any other suitable form for presentation on a display device depending upon applications used by users to interact with the system 400.

The merchant device 440 may further include a display 444 and input devices 445. The display 444 may be any type of device for presenting visual information such as a computer monitor, a flat panel display, and a mobile device screen, including liquid crystal displays, light-emitting diode displays, plasma panels, and cathode ray tube displays. The input devices 445 may include any device for entering information into the merchant device 440 that is available and supported by the merchant device 440, such as a touch-screen, keyboard, mouse, cursor-control device, touch-screen, microphone, digital camera, video recorder or camcorder. These devices may be used to enter information and interact with the software and other devices described herein.

The system 400 may include one or more networks 450. In some examples, the network 450 may be one or more of a wireless network, a wired network or any combination of wireless network and wired network, and may be configured to connect the user device 410, the server 420, the database 430, and the merchant device 440. For example, the network 450 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 450 may include, without limitation, telephone lines, fiber optics, IEEE Ethernet 902.3, a wide area network, a wireless personal area network, a LAN, or a global network such as the Internet. In addition, the network 450 may support an Internet network, a wireless communication network, a cellular network, or the like, or any combination thereof. The network 450 may further include one network, or any number of the exemplary types of networks mentioned above, operating as a stand-alone network or in cooperation with each other. The network 450 may utilize one or more protocols of one or more network elements to which they are communicatively coupled. The network 450 may translate to or from other protocols to one or more protocols of network devices. Although the network 450 is depicted as a single network, it should be appreciated that according to one or more examples, the network 450 may comprise a plurality of interconnected networks, such as, for example, the Internet, a service provider's network, a cable television network, corporate networks, such as credit card association networks, and home networks. The network 450 may further comprise, or be configured to create, one or more front channels, which may be publicly accessible and through which communications may be observable, and one or more secured back channels, which may not be publicly accessible and through which communications may not be observable.

In some examples, communications between the user device 410, server 420, and merchant device 440 using the network 450 can occur using one or more front channels and one or more secure back channels. A front channel may be a communication protocol that employs a publicly accessible and/or unsecured communication channel such that a communication sent to the user device 410, server 420, and/or merchant device 440 may originate from any other device, whether known or unknown to the user device 410, server 420, and/or merchant device 440, if that device possesses the address (e.g., network address, Internet Protocol (IP) address) of the user device 410, server 420, and/or merchant device 440. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 410, server 420, and/or merchant device 440 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some examples, the user device 410 can be associated with a user and may be operated by that user, such as a user of a bank. The server 420 can be associated with a financial institution, such as a bank or a credit card company that offers financial services to the user of the user device 410. The merchant device 440 can be associated with a merchant with which the user of the user device 410 may conduct transactions, and may be operated by that merchant, such as an online retailer.

The contactless card 460 can be configured to transmit a cryptogram to the user device 410 upon tapping to the user device 410. The user device 410 may be configured to read the cryptogram from the contactless card 460 after entry of the contactless card 460 into a communication field of the user device 410. The user device 410 may then transmit the cryptogram to the server 420. The server 420 may be configured to verify the cryptogram by searching the database 430.

The contactless card 460 can perform authentication and numerous other functions that may otherwise require a user to carry a separate physical token in addition to the contactless card 460. By employing a contactless interface, the contactless card 460 may be provided with a method to interact and communicate between a user's device (such as a mobile phone or the user device 410) and the card itself. For example, the Europay, Mastercard, and Visa (EMV)

protocol, which underlies many credit card transactions, includes an authentication process which suffices for operating systems for Android® but presents challenges for iOS®, which is more restrictive regarding near field communication (NFC) usage, as it can be used only in a read-only manner. Exemplary embodiments of the contactless card 460 described herein utilize NFC technology.

The contactless card 460, which may comprise a payment card, such as a credit card, debit card, or gift card, may be issued by a service provider displayed on the front or back of the contactless card 460. In some examples, the contactless card 460 is not related to a payment card, and may comprise, without limitation, an identification card, a membership card, and a travel card. In some examples, the contactless card 460 may comprise a dual interface contactless payment card. The contactless card 460 may comprise a substrate, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 460 may have physical characteristics compliant with the ID-1 format of the ISO/IEC 7810 standard, and the contactless card 460 may otherwise be compliant with the ISO/IEC 14443 standard. However, it is understood that the contactless card 460 according to the present disclosure may have different characteristics, and the present disclosure does not require the contactless card 460 to be implemented in a payment card.

The contactless card 460 may also include identification information displayed on the front and/or back of the contactless card 460, and a contact pad. The contact pad may be configured to establish contact with another communication device, such as a user device, smart phone, laptop, desktop, or tablet computer. The contactless card 460 may also include processing circuitry, antenna and other components. These components may be located behind the contact pad or elsewhere on the substrate. The contactless card 460 may also include a magnetic strip or tape, which may be located on the back of the contactless card 460.

The contact pad of the contactless card 460 may include processing circuitry for storing and processing information, including a processor 462 and a memory 464. It is understood that the processing circuitry may contain additional components, including processors, memories, error and parity/CRC checkers, data encoders, anticollision algorithms, controllers, command decoders, security primitives and tamperproofing hardware, as necessary to perform the functions described herein.

The memory 464 may be a read-only memory, write-once read-multiple memory or read/write memory, e.g., RAM, ROM, and EEPROM, and the contactless card 460 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 464 may be configured to store one or more applets, one or more counters, and a unique user identifier. The one or more applets may comprise one or more software applications configured to execute on one or more contactless cards, such as Java Card applet. However, it is understood that the one or more applets are not limited to Java Card applets, and instead may be any software application operable on contactless cards or other devices having limited memory. The one or more counters may comprise a numeric counter sufficient to store an integer. The unique user identifier may comprise a unique alphanumeric identifier assigned to a user of the contactless card 460, and the identifier may distinguish the user of the contactless card 460 from other contactless card users. In some examples, the user identifier may identify both a user and an account assigned to that user and may further identify the contactless card 460 associated with the user's account.

In some embodiments, the memory 464 may also have stored public and private card encryption keys. In some embodiments, the private and public encryption keys may be permanently hard-wired into the card memory. In various embodiments, the memory 464 may have stored therein instructions for generating encrypted information and transmitting it to a receiving device (e.g., the user device 410). Such encrypted information may be or include an encrypted verification block or signature that may be used to authenticate and verify the presence of the card 460 during transaction processing. In some embodiments, encrypted information may be unique to a particular communication (e.g., a particular NFC transmission by the card 460).

The processor 462 and memory 464 elements of the foregoing exemplary embodiments are described with reference to the contact pad, but the present disclosure is not limited thereto. It is understood that these elements may be implemented outside of the contact pad or entirely separate from it, or as further elements in addition to the processor 462 and the memory 464 elements located within the contact pad.

In some examples, the contactless card 460 may comprise one or more antennas. The one or more antennas may be placed within the contactless card 460 and around the processing circuitry of the contact pad. For example, the one or more antennas may be integral with the processing circuitry and the one or more antennas may be used with an external booster coil. As another example, the one or more antennas may be external to the contact pad and the processing circuitry.

In an embodiment, the coil of contactless card 460 may act as the secondary of an air core transformer. A terminal may communicate with the contactless card 460 by cutting power or amplitude modulation. The contactless card 460 may infer the data transmitted from the terminal using the gaps in the contactless card's power connection, which may be functionally maintained through one or more capacitors. The contactless card 460 may communicate back by switching a load on the contactless card's coil or load modulation. Load modulation may be detected in the terminal's coil through interference.

As explained above, the contactless card 460 may be built on a software platform operable on smart cards or other devices having limited memory, such as JavaCard, and one or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

The contactless card 460 may be configured for communication with the user device 410 via a communication interface configured for establishing communication with the user device 410. The communication interface may be configured for contact-based communication, in which case the interface may have electrical circuitry and contact pads on the surface of the card 460 for establishing direct electrical communication between the card 460 and the user device 410. Alternatively or in addition, the communication interface may be configured for contactless communication with the user device 410. In such embodiments, the communication interface may be or include an NFC communication interface configured for communication with other NFC communication devices when the card 460 is within a predetermined NFC range. In some embodiments, the card 460 may include a second communication interface configured for establishing short range communication with the user device 410 via Bluetooth, or other short range communication methodology. In such embodiments, the card 460 may have a short range communication antenna that is included in or connected to the short range communication interface. The card 460 may also include a power management system for use in managing the distribution of power during an NFC transaction.

Figure 5:
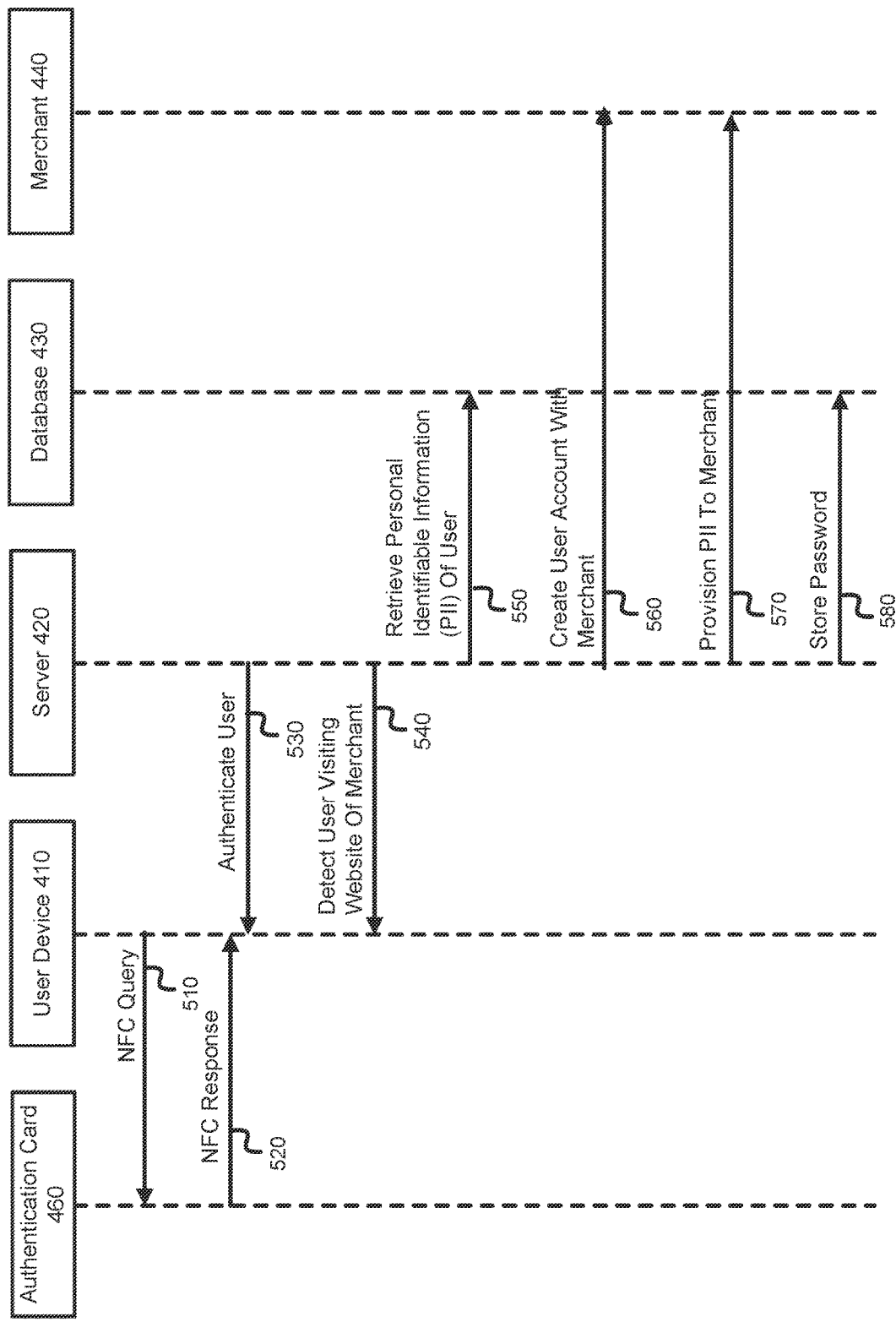
FIG. 5 is a diagram of sequential interactions between components of the system in FIG. 4 according to an example embodiment.

FIG. 5 illustrates an example diagram 500 of sequence interaction between the components of the system 400 according to an example embodiment. FIG. 5 may reference the same or similar components as those illustrated in FIGS. 1-4, including a user device, a server, a database, a merchant device and a contactless card.

When a user wants to make an online purchase from a merchant, the user may use the user device 410 to log into his/her bank account from a bank application (the application 413) installed on the user device 410. In this example embodiment, the user device 410 transmits an NFC prompt/query to the contactless card 460 at step 510. The user device 410 may include an NFC interface configured for establishing NFC communication with other NFC-equipped devices (the contactless card 460 in this embodiment). In some of these embodiments, the NFC interface of the user device 410 may be or include an NFC receiver configured for selectively activating a magnetic field for use in establishing near field communication with an NFC transmitter. The NFC interface of the user device 410 is configured for establishing NFC communication when a passive NFC tag or other NFC-enabled device is brought into the magnetic field and within NFC communication range of the user device 410. The NFC interface of the user device 410 is configured, in particular, for communication with the NFC-enabled card when the card 460 is brought within communication range of the user device 410 (such as, the contactless card 460 is tapped by the user to the user device 410). As used herein, a tap of the contactless card 460 to the user device 410 may not indicate that the contactless card 460 is in a physical contact with the user device 410. A tap of the contactless card 460 to the user device 410 may refer to entry of the contactless card 460 into the NFC communication field of the user device 410.

In response, after entry of the contactless card 460 into the NFC communication field of the user device 410, the contactless card 460 transmits, at step 520 to the user device 410 NFC response information (e.g., a cryptogram) usable by the server 420 to authenticate the user. The NFC response information may be or include, for example, security information encrypted by the contactless card 460 using a private key unique to the card that is known only to the card account administrator (the server 420). The cryptogram may be stored in the memory of the contactless card 460. The cryptogram includes the unique identifier of the contactless card 460.

The user device 410 transmits the NFC response information (the cryptogram) the server 420. At step 530, the server 420 receives the cryptogram from the user device 410. The server 420 validates the cryptogram, decrypts the cryptogram and extracts the unique identifier of the contactless card 460 through the card authentication module 4232 of the server 420. When the server receives the cryptogram, the server may decrypt the cryptogram after verifying the cryptogram. The server may then extract the unique identifier of the contactless card 460 which is uniquely associated with the user bank account. The server 420 then authenticate the user based on the unique identifier of the contactless card 460.

In some embodiments, the server 420 may also require the user to enter a personal identification code/number (PIN) as a second authentication factor. Alternatively, the server 420 may require the user to enter a one-time passcode (OTP) as a second authentication factor that is randomly generated and transmitted by the server 420 to the user device 410 in a text message.

Once logging into the bank account, the user may visit a website associated with the merchant and hosted by the merchant device 440. At step 540, the server 420 may detect the user is visiting the website of the merchant, such as by receiving the Uniform Resource Locator (URL) link (i.e., a web address) of the website of the merchant the user is entering.

At step 550, the server 420 may retrieve personal identifiable information (PII) of the user associated with the financial/bank account of the user and stored in the database 430. The PII may include, but is not limited to, a home/mailing address, a billing address, a mobile phone number, a home phone number, an Email address, a 16-digit credit card number, a 16-digit virtual card number (VCN), and/or a credit card expiration date.

At step 560, the server 420 may automatically create an online account with the merchant on behalf of the user. For example, the server 420 may go to the website of the merchant using Robotic Process Automation (RPA). The RPA can automatically create the online account with the merchant on behalf of the user, which includes a login user name and/or password. The login user name can be the email address of the user included in the PII of the user, and the password can be autogenerated by the RPA. In some embodiment, the merchant device 440 may send to the email address of the user an account activation link. The RPA can automatically click on the account activation link to activate the created online account.

At step 570, the server 420 can automatically provision the PII to the online account that may be hosted on the merchant device 140 of the merchant. For example, the RPA may put the home/mailing address, the billing address, the mobile phone number, the Email address, the 16-digit credit card number, the 16-digit virtual card number (VCN), and/or the credit card expiration date on file with the merchant, which is all the necessary information to create the online account with the merchant.

At step 580, the server 420 may store the password of the online account. For example, the server 420 may save the password to an integrated password management application, in the bank application, and/or in the iOS® keychain. The user and the server 420 can access the password. The user may change the password as he/she wishes.

Figure 6:
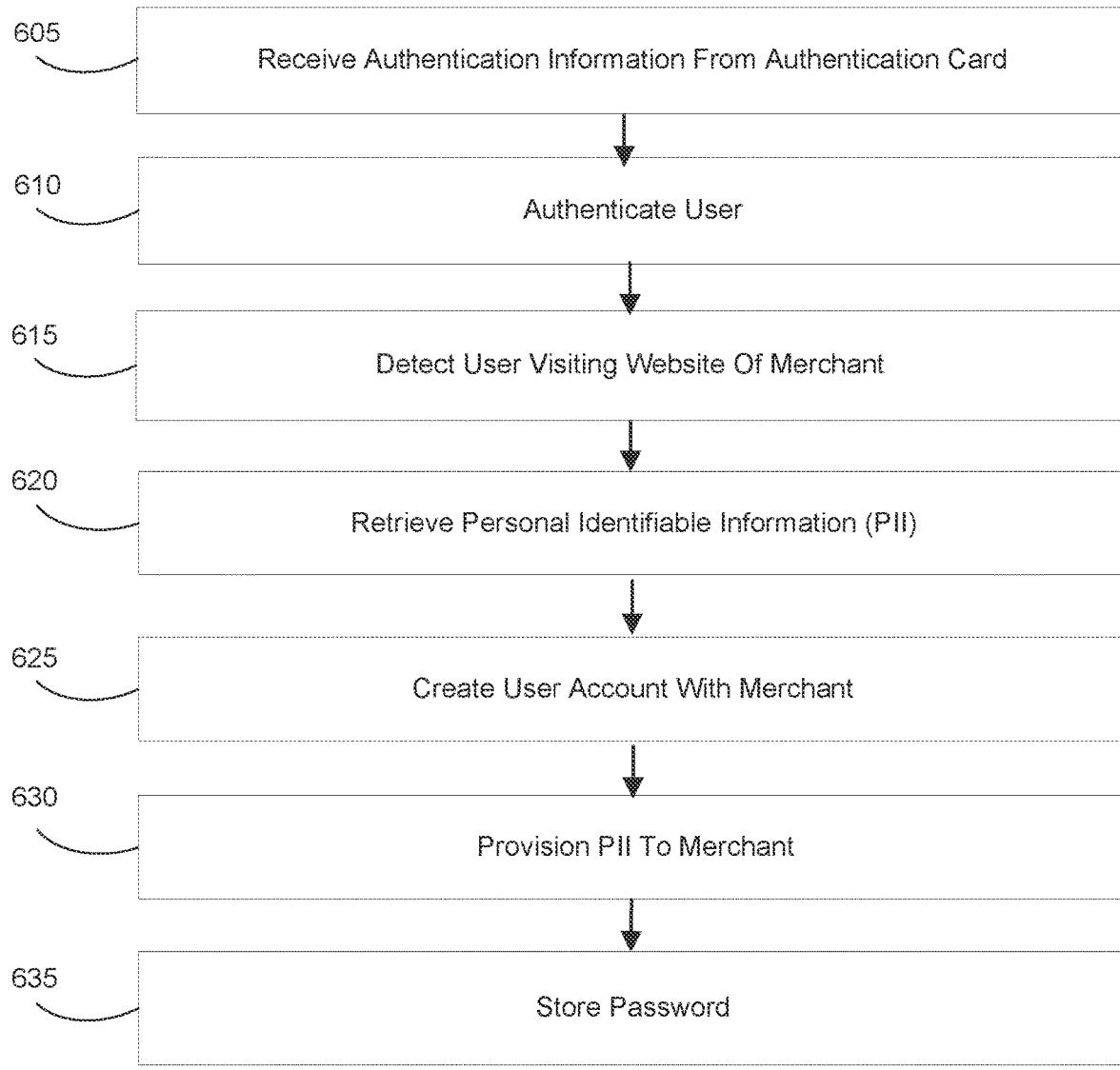
FIG. 6 is a flow chart of a method for automatic management of multiple account according to an example embodiment.

FIG. 6 illustrates a flow chart of an example method 600 for automatic multiple account management according to an example embodiment. FIG. 6 may reference the same or similar components as those illustrated in FIGS. 1-5, including a user device, a server, a database, a merchant device, and a contactless card. The method 600 can be implemented in the system 400 and may include, but is not limited to the following steps.

When a user wants to make an online purchase from a merchant, the user may use the user device 410 to log into his/her bank account from a bank application (the application 413) installed on the user device 410. In this example embodiment, the user device 410 transmits an NFC prompt/query to the contactless card 460. In response, after entry of the contactless card 460 into the NFC communication field of the user device 410, the contactless card 460 transmits to the user device 410 NFC response information (e.g., a cryptogram) usable by the server 420 to authenticate the user. The user device 410 transmits the NFC response information (the cryptogram) the server 420. In step 605, the server 420 receives authentication information (the cryptogram) from the authentication card (the card 460) through the user device 410.

In step 610, the server 420 validates the cryptogram, decrypts the cryptogram and extracts the unique identifier of the contactless card 460 through the card authentication module 4232 of the server 420. When the server receives the cryptogram, the server may decrypt the cryptogram after verifying the cryptogram. The server may then extract the unique identifier of the contactless card 460 which is uniquely associated with the user bank account. The server 420 then authenticate the user based on the unique identifier of the contactless card 460.

In some embodiments, the server 420 may also require the user to enter a personal identification code/number (PIN) as a second authentication factor. Alternatively, the server 420 may require the user to enter a one-time passcode (OTP) as a second authentication factor that is randomly generated and transmitted by the server 420 to the user device 410 in a text message.

Once logging into the bank account, the user may visit a website associated with the merchant and hosted by the merchant device 440. At step 615, the server 420 may detect the user is visiting the website of the merchant, such as by receiving the Uniform Resource Locator (URL) link (i.e., a web address) of the website of the merchant the user is entering.

At step 620, the server 420 may retrieve personal identifiable information (PII) of the user associated with the financial/bank account of the user and stored in the database 430. The PII may include, but is not limited to, a home/mailing address, a billing address, a mobile phone number, a home phone number, an Email address, a 16-digit credit card number, a 16-digit virtual card number (VCN), and/or a credit card expiration date.

At step 625, the server 420 may automatically create an online account with the merchant on behalf of the user. For example, the server 420 may go to the website of the merchant using Robotic Process Automation (RPA). The RPA can automatically create the online account with the merchant on behalf of the user, which includes a login user name and/or password. The login user name can be the email address of the user included in the PII of the user, and the password can be autogenerated by the RPA. In some embodiment, the merchant device 440 may send to the email address of the user an account activation link. The RPA can automatically click on the account activation link to activate the created online account.

At step 630, the server 420 can automatically provision the PII to the online account that may be hosted on the merchant device 140 of the merchant. For example, the RPA may put the home/mailing address, the billing address, the mobile phone number, the Email address, the 16-digit credit card number, the 16-digit virtual card number (VCN), and/or the credit card expiration date on file with the merchant, which is all the necessary information to create the online account with the merchant.

At step 635, the server 420 may store the password of the online account. For example, the server 420 may save the password to an integrated password management application, in the bank application, and/or in the iOS® keychain. The user and the server 420 can access the password. The user may change the password as he/she wishes.

Figure 7:
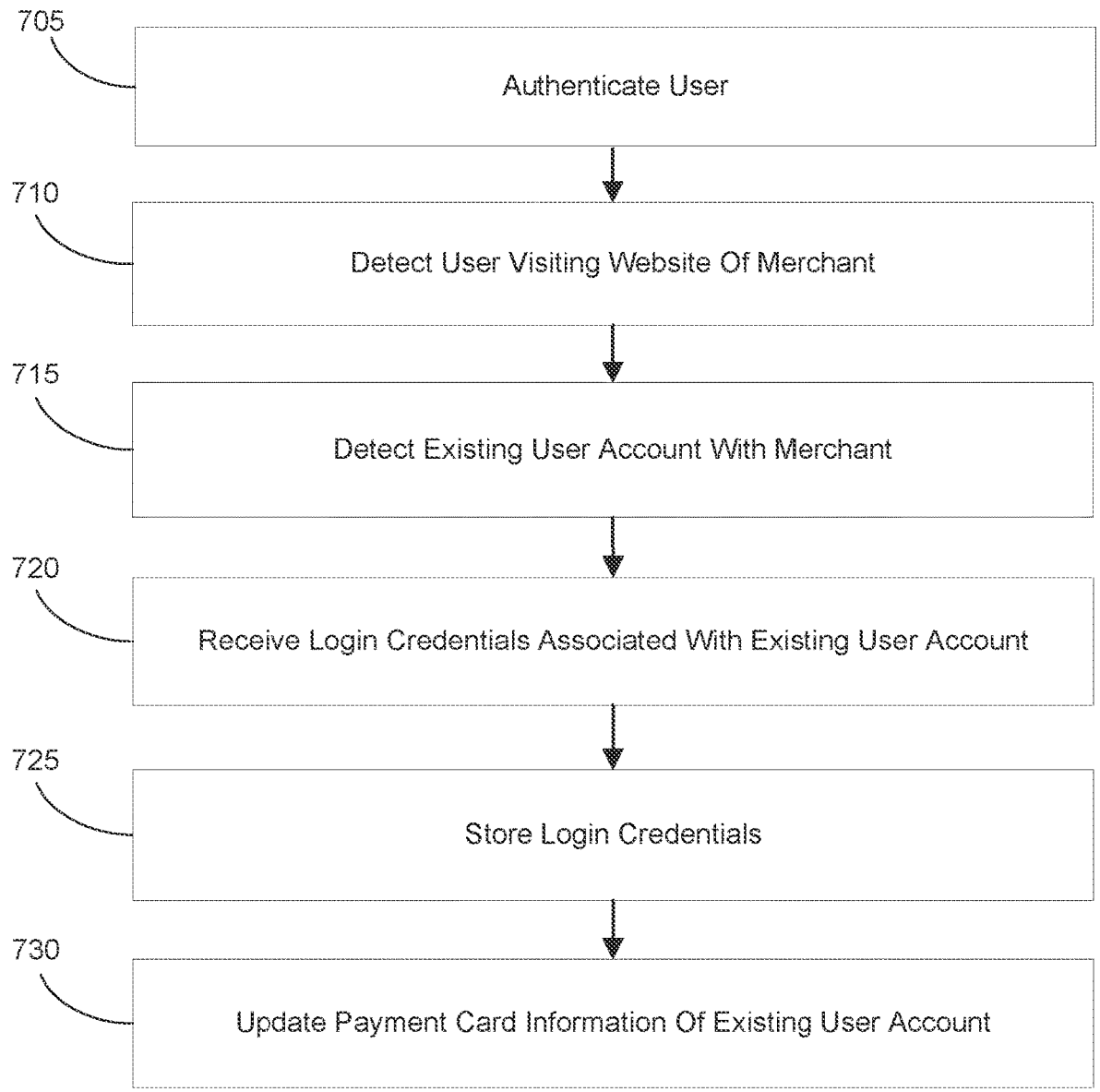
FIG. 7 is a flow chart illustrating a method for automatic management of multiple account according to an example embodiment.

In some embodiments, the user may already have an online account with a merchant. In such scenario, the systems and methods disclosed herein can automatically detect the existing online account and update the existing account information if needed. FIG. 7 illustrates a flow chart of an example method 700 for automatic multiple account management according to an example embodiment. FIG. 7 may reference the same or similar components as those illustrated in FIGS. 1-6, including a user device, a server, a database, a merchant device, and a contactless card. The method 700 can be implemented in the systems 100 and 400 and may include, but is not limited to the following steps.

In step 705, the server 120 or 420 authenticates the user as described above. In step 710, the server 120 or 420 detects the user visiting a website of a merchant. In step 715, the server 120 or 420 detects an existing account of the user with the merchant. For example, when the server 120 or 420 tries to create an new account with the merchant for the user using an on-file email address of the user as the username for the new account, the server 120 may receive a message from the merchant device 140 or 440 of the merchant indicating that an account with that email address has already existed with the merchant. For example, the server 120 or 420 may receive a message from the merchant device 140 or 440 saying "an email already exists for this account."

In step 720, the server 120 or 420 may notify the user that an account already exists with the merchant and further request the login account credential from the user. For example, the server 120 or 420 may transmit to the user device 110 or 410 a message "we believe you already got an account with this merchant. Would you like to enter in your user name and password for it?" In response, the user can transmit the login credentials back to the server 120 or 420. The server 120 or 420 receives the login credential associated with the existing account and feeds the received login credential into the RPA 1231 or 4231.

In step 725, the server 120 or 420 may store the login credentials to an integrated password management application, in the bank application, and/or in the iOS® keychain, so the user and the server 120 or 420 can access the login credentials. The user may change the login credentials as he/she wishes.

After receiving the login credentials, the server 120 or 420 may use the RPA to log into the existing account with the merchant. Upon logging into the existing account, the server 120 or 420 may check the existing account information to determine if the existing account information is up to date and/or incorrect, and update the payment card information if necessary. For example, the user may have moved to another address and updated the home/mailing address in his/her bank account, but forgot to update the home/mailing address stored in the existing account with the merchant, so the server 120 or 420 can accordingly update the home/mailing address stored in the existing account with the merchant. Similarly, the server 120 or 420 may update other account information, such as, phone number, billing address, credit card number, and the like.

In some embodiments, the user may request the server through the banking application to change/update a payment card with a merchant. For example, if the user wants to change the card, the user may transmit through the banking application to the server a message like "change my card on Amazon.com." The server may then log into the Amazon® account of the user on behalf of the user and change the card associated with the Amazon® account of the user. As another example, if the credit card with a merchant was stolen or a fraudulent transaction has happened to the credit card, the user may notify the server through the banking application, and the server can log into the account with the merchant on behalf of the user and change the card.

In some embodiments, the user may tell the server which website/merchant the user wants to create a new account, and then server can go to that website and create a new account on behalf of the user. In some embodiments, the server may request a permission from the user to create a new account or update an existing account.

In some embodiments, a merchant-specific virtual card may be used for the online account with a merchant, so the merchant-specific virtual card only works at that merchant's website. If the merchant-specific virtual card expires soon or has expired, the merchant may ask the user to input a new card number because the card will expire soon or has expired, which mostly just involves the user to update the expiration date. In this scenario, the server is notified and then automatically update that card at the merchant's website, for example, a new virtual card is generated with a new expiration date.

In some embodiments, the server may experience failures when creating new accounts and/or updating existing accounts, such as failed log-in attempts or the RPA cannot find the right fields for the user name and password. The server may perform some troubleshooting to find out what is happening, for example, is the merchant's website changed? or is the merchant's website down? and the like. The server may then notify the user of what happened to the merchant's website. The user may then manually create or update the account with the merchant if they desire. For example, the server may copy the credit card number and/or the VCN number to the user's clipboard in the banking application and then put on the page in the banking application a link to the website of the merchant, so the user can click on the link to go on over to website and then paste the credit card number and/or the VCN number into the website.

In some embodiments, machine learning (ML) algorithms or models can be used to train the RPA for creating and/or updating accounts. For example, the fields for user name and password may be different for different merchants websites. The RPA may be trained to identify those fields for different merchants, such that the accounts can be properly created and/or updated. For example, the RPA may be trained to look for certain things even for one merchant website because that merchant website may not stay as-is forever. The user name, password, or other type of fields can be identified through the document object model, which helps to train the machine model to search for and get to these fields.

In the present disclosure, the server may use any suitable ML models or algorithms. The various ML models may comprise supervised learning (e.g., classification and regression), unsupervised learning (e.g., pattern recolonization and cluster analysis), semi-supervised learning, reinforcement learning, self-learning, feature learning (e.g., sparse dictionary learning), associate rules and anomaly detection. The various ML models can utilize various neural network, such as Bidirectional Encoder Representations from Transformers (BERT), convolutional neural networks (CNNs) or recurrent neural networks (RNNs).

The ML models described herein can utilize a Bidirectional Encoder Representations from Transformers (BERT) models. BERT models utilize multiple layers of so called "attention mechanisms" to process textual data and make predictions. These attention mechanisms effectively allow the BERT model to learn and assign more importance to words from the text input that are more important in making whatever inference is trying to be made.

A CNN can include one or more convolutional layers (e.g., often with a subsampling step) and then followed by one or more fully connected layers as in a standard multi-layer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks (LSTMs) and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The ML models described herein may be trained on one or more training datasets, each of which may comprise one or more types of data. In some examples, the training datasets may comprise previously-collected data, such as data collected from previous uses of the same type of systems described herein and data collected from different types of systems. In other examples, the training datasets may comprise continuously-collected data based on the current operation of the instant system and continuously-collected data from the operation of other systems. In some examples, the training dataset may include anticipated data, such as the anticipated future workloads, currently scheduled workloads, and planned future workloads, for the instant system and/or other systems. In other examples, the training datasets can include previous predictions for the instant system and other types of system, and may further include results data indicative of the accuracy of the previous predictions. In accordance with these examples, the predictive models described herein may be training prior to use and the training may continue with updated datasets that reflect additional information.

The present disclosure provides an automatic system comprising a server. The server can be configured to: authenticate a user; detect the user is visiting an online website associated with a merchant; create a user account with the merchant for the user, the user account including a user name and a password; retrieve personal identifiable information (PII) of the user from a financial account associated with the user, the PII including information of a payment card of the user; provision the PII of the user to the merchant; and store the password. The server includes a datastore and the password is stored in the datastore. The server is further configured to be integrated with a password management database; and the action of store the password comprises store the password in the password management database. The server is further configured to receive authentication information from an authentication card associated with the user; and the action of authenticate a user comprises authenticate the user based on the authentication information. The server is further configured to: receive a request from the user or the merchant requesting updating the information of the payment card; and in response to the request, update the information of the payment card. The server is further configured to: detect an existing user account of the user with the merchant; and receive login credentials associated with the existing user account from the user. The PII further includes at least one of a home address, a billing address, a mobile phone number, a home phone number, an email address, a 16-digit credit card number, a 16-digit virtual card number, or a credit card expiration date.

The present disclosure also provides a method. The method comprises: authenticating, by a server, a user; detecting, by the server, the user is visiting an online website associated with a merchant; creating, by the server, a user account with the merchant for the user, the user account including a user name and a password; retrieving, by the server, personal identifiable information (PII) of the user from a financial account associated with the user, the PII including information of a payment card of the user; provisioning, by the server, the PII of the user to the merchant; and storing, by the server, the password. The server includes a datastore and the password is stored in the datastore. The method further comprises integrating the server with a password management database, and the action of storing the password comprises storing the password in the password management database. The method further comprises receiving, by the server, authentication information from an authentication card associated with the user, and the action of authenticating a user comprises authenticating the user based on the authentication information. The method further comprises: receiving, by the server, a request from the user or the merchant requesting updating the information of the payment card; and in response to the request, updating, by the server, the information of the payment card. The method further comprises: detecting, by the server, an existing user account of the user with the merchant; and receiving, by the server, credentials associated with the existing user account from the user. The PII further includes at least one of a home address, a billing address, a mobile phone number, a home phone number, an Email address, a 16-digit credit card number, a 16-digit virtual card number, or a credit card expiration date.

The present disclosure provides a non-transitory, computer readable medium. The non-transitory, computer readable medium comprises instructions that, when executed on a server, perform actions comprising: training one or more machine learning models using user account data fields associated with one or more merchant websites; authenticating a user; detecting that the user is visiting an online website associated with a merchant; identifying a user name field and a password field of the online website using the one or more machine learning models; creating a user account with the merchant for the user on the online website, the user account including a user name corresponding to the user name field and a password corresponding to the password field; retrieving personal identifiable information (PII) of the user from a financial account associated with the user, the PII including information of a payment card of the user; provisioning the PII of the user to the merchant; and storing the password. The server includes a datastore and the password is stored in the datastore. The actions further comprise integrating the server with a password management database, wherein the action of storing the password comprises storing the password in the password management database. The actions further comprise receiving authentication information from an authentication card associated with the user, wherein the action of authenticating a user comprises authenticating the user based on the authentication information. The actions further comprise: receiving a request from the user or the merchant requesting updating the information of the payment card; and in response to the request, updating the information of the payment card. The actions further comprise: detecting an existing user account of the user with the merchant; and receiving credentials associated with the existing user account from the user.

Throughout the disclosure, the term merchant is used, and it is understood that the present disclosure is not limited to a particular merchant or type of merchant. Rather, the present disclosure includes any type of merchant, vendor, or other entity involving in activities where products or services are sold or otherwise provided.

Through this disclosure, the term "transaction" is used, and it is understood that the present disclosure is not limited to a particular transaction or type of transaction. Rather, the present disclosure can include, without limitation, financial transactions, identity verification transactions, area access transactions, user authentication transactions, membership verification transactions, eligibility verification transactions, and any other operation involving a card.

In some examples, exemplary procedures in accordance with the present disclosure described herein can be performed by a processing arrangement and/or a computing arrangement (e.g., a computer hardware arrangement). Such processing and/or computing arrangement can be, for example entirely or a part of, or include, but not limited to, a computer and/or processor that can include, for example one or more microprocessors, and use instructions stored on a computer-accessible medium (e.g., RAM, ROM, hard drive, or other storage device). For example, a computer-accessible medium can be part of the memory of a smart card, a user device, a server and/or a merchant device or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium. The instructions can configure the processing and/or computing arrangement to execute certain exemplary procedures, processes, and methods, as described herein above, for example.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automatic system comprising a server, the server configured to:

authenticate a user based on a login credential provided by the user and a second authentication factor through a financial institution application;

detect the user is visiting an online website associated with a merchant based on receiving a Uniform Resource Locator (URL) of the online website;

create a user account with the merchant for the user, the user account including a user name and a password wherein the user account is created using Robotic Process Automation (RPA);

retrieve personal identifiable information (PII) of the user from a financial account associated with the user, the PII including information of a payment card of the user;

provision the PII of the user to the merchant using the RPA; and store the password, wherein the server is a financial institution server and is accessed through the financial institution application and the financial account is with the financial institution associated with the server.

2. The system of claim 1, wherein the server includes a datastore and the password is stored in the datastore.

3. The system of claim 1, wherein:

the server is further configured to be integrated with a password management database; and the action of store the password comprises store the password in the password management database.

4. The system of claim 1, wherein:

the server is further configured to receive authentication information from an authentication card associated with the user.

5. The system of claim 1, wherein the server is further configured to:

receive a request from the user or the merchant requesting updating the information of the payment card; and in response to the request, update the information of the payment card.

6. The system of claim 1, wherein the server is further configured to:

detect an existing user account of the user with the merchant; and receive login credentials associated with the existing user account from the user.

7. The system of claim 1, wherein the PII further includes at least one of a home address, a billing address, a mobile phone number, a home phone number, an Email address, a 16-digit credit card number, a 16-digit virtual card number, or a credit card expiration date.

8. A method, comprising:

authenticating, by a financial institution server, a user based on a login credential provided by the user and a second authentication factor through a financial institution application;

detecting, by the financial institution server, the user is visiting an online website associated with a merchant based on receiving a Uniform Resource Locator (URL) of the online website;

creating, by the financial institution server, a user account with the merchant for the user, the user account including a user name and a password wherein the user account is created using Robotic Process Automation (RPA);

retrieving, by the financial institution server, personal identifiable information (PII) of the user from a financial account associated with the user, the PII including information of a payment card of the user;

provisioning, by financial institution the server, the PII of the user to the merchant using the RPA; and storing, by the financial institution server, the password, wherein the financial institution server is accessed through the financial institution application and the financial account is with the financial institution associated with the server.

9. The method of claim 8, wherein the financial institution server includes a datastore and the password is stored in the datastore.

10. The method of claim 8, further comprising integrating the financial institution server with a password management database, wherein the action of storing the password comprises storing the password in the password management database.

11. The method of claim 8, further comprising receiving, by the financial institution server, authentication information from an authentication card associated with the user.

12. The method of claim 8, further comprising:

receiving, by the financial institution server, a request from the user or the merchant requesting updating the information of the payment card; and in response to the request, updating, by the financial institution server, the information of the payment card.

13. The method of claim 8, further comprising:

detecting, by the financial institution server, an existing user account of the user with the merchant; and receiving, by the financial institution server, credentials associated with the existing user account from the user.

14. The method of claim 8, wherein the PII further includes at least one of a home address, a billing address, a mobile phone number, a home phone number, an Email address, a 16-digit credit card number, a 16-digit virtual card number, or a credit card expiration date.

15. A non-transitory, computer readable medium comprising instructions that, when executed on a server, perform actions comprising:

authenticating a user based on a login credential provided by the user and a second authentication factor provided through a financial institution application;

detecting that the user is visiting an online website associated with a merchant based on receiving a Uniform Resource Locator (URL) of the online website;

creating a user account with the merchant for the user, the user account including a user name and a password wherein the user account is created using Robotic Process Automation (RPA);

retrieving personal identifiable information (PII) of the user from a financial account associated with the user, the PII including information of a payment card of the user;

provisioning the PII of the user to the merchant using the RPA; and storing the password, wherein the server is a financial institution server and is accessed through the financial institution application and the financial account is with the financial institution associated with the server.

16. The non-transitory, computer readable medium of claim 15, wherein the server includes a datastore and the password is stored in the datastore.

17. The non-transitory, computer readable medium of claim 15, wherein the actions further comprise integrating the server with a password management database, wherein the action of storing the password comprises storing the password in the password management database.

18. The non-transitory, computer readable medium of claim 15, the actions further comprising receiving authentication information from an authentication card associated with the user.

19. The non-transitory, computer readable medium of claim 15, wherein the actions further comprise:
   receiving a request from the user or the merchant requesting updating the information of the payment card; and
   in response to the request, updating the information of the payment card.

20. The non-transitory, computer readable medium of claim 15, wherein the actions further comprise:
   detecting an existing user account of the user with the merchant; and
   receiving credentials associated with the existing user account from the user.

* * * * *